(12) United States Patent
Hirao et al.

(10) Patent No.: US 11,869,491 B2
(45) Date of Patent: Jan. 9, 2024

(54) ABSTRACT GENERATION DEVICE, METHOD, PROGRAM, AND RECORDING MEDIUM

(71) Applicant: NIPPON TELEGRAPH AND TELEPHONE CORPORATION, Tokyo (JP)

(72) Inventors: Tsutomu Hirao, Tokyo (JP); Atsunori Ogawa, Tokyo (JP); Tomohiro Nakatani, Tokyo (JP); Masaaki Nagata, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 155 days.

(21) Appl. No.: 17/425,696

(22) PCT Filed: Jan. 16, 2020

(86) PCT No.: PCT/JP2020/001250
§ 371 (c)(1),
(2) Date: Jul. 23, 2021

(87) PCT Pub. No.: WO2020/158409
PCT Pub. Date: Aug. 6, 2020

(65) Prior Publication Data
US 2022/0189468 A1 Jun. 16, 2022

(30) Foreign Application Priority Data

Jan. 28, 2019 (JP) ................... 2019-012210

(51) Int. Cl.
*G10L 15/193* (2013.01)
*G10L 15/08* (2006.01)
*G10L 15/22* (2006.01)

(52) U.S. Cl.
CPC .......... *G10L 15/193* (2013.01); *G10L 15/083* (2013.01); *G10L 15/22* (2013.01)

(58) Field of Classification Search
CPC ...... G10L 15/193; G10L 15/083; G10L 15/22
(Continued)

(56) References Cited

U.S. PATENT DOCUMENTS 10,255,346 B2 * 4/2019 Horesh ................. G06Q 30/01
11,488,604 B2 * 11/2022 Thomson ................ G06N 3/08
11,562,731 B2 * 1/2023 Thomson ................ G10L 15/02

OTHER PUBLICATIONS

Hori et al. (2004) "Speech summarization: An approach through word extraction and a method for evaluation" IEICE Transactions on Information and Systems, vol. E87-D, No. 1, pp. 15-25.

* cited by examiner

*Primary Examiner* — Susan I McFadden

(57) ABSTRACT

A speech recognition unit converts an input utterance sequence into a confusion network sequence constituted by a k-best of candidate words of speech recognition results; a lattice generating unit generates a lattice sequence having the candidate words as internal nodes and a combination of k words among the candidate words for an identical speech as an external node, in which edges are extended between internal nodes other than internal nodes included in an identical external node, from the confusion network sequence; an integer programming problem generating unit generates an integer programming problem for selecting a path that maximizes an objective function including at least a coverage score of an important word, of paths following the internal nodes with the edges extended, in the lattice sequence; and the summary generating unit generates a high-quality summary having less speech recognition errors and low redundancy using candidate words indicated by the internal nodes included in the path selected by solving the (Continued)

integer programming problem, under a constraint on the length of a summary to be generated.

14 Claims, 5 Drawing Sheets

(58) Field of Classification Search
USPC .......................................................... 704/257
See application file for complete search history.

ABSTRACT GENERATION DEVICE, METHOD, PROGRAM, AND RECORDING MEDIUM

CROSS-REFERENCE TO RELATED APPLICATIONS

This application is a U.S. 371 Application of International Patent Application No. PCT/JP2020/001250, filed on 16 Jan. 2020, which application claims priority to and the benefit of JP Application No. 2019-012210, filed on 28 Jan. 2019, the disclosures of which are hereby incorporated herein by reference in their entireties.

TECHNICAL FIELD

The disclosed technology relates to a summary generating apparatus, a summary generating method, a summary generating program, and a storage medium, and particularly to a summary generating apparatus, a summary generating method, a summary generating program, and a storage medium that automatically summarize a speech recognition result.

BACKGROUND ART

A technology for summarizing a speech recognition result in the related art generates a summary by sentence extraction or word extraction for a 1-best speech recognition result. For example, a technique has been proposed that generates, as a summary, a partial word string that maximizes the sum of word importance, speech recognition confidence, and language likelihood, under a constraint on a certain length for a 1-best speech recognition result (see Non Patent Literature 1).

CITATION LIST

Non Patent Literature

Non Patent Literature 1: C. Hori and S. Furui, "Speech summarization: Anapproach through word extraction and a method for evaluation," IEICETrans. on Inf. & Syst., vol. E87-D, no. 1, pp. 1525, January 2004.

SUMMARY OF THE INVENTION

Technical Problem

However, performance of the current speech recognition technology is high but is not 100%, and thus if only the 1-best speech recognition result is used to generate a summary, it is likely that a recognition error is included in the summary. In addition, the technology for summarizing a speech recognition result in the related art does not use a concept of covering important words, which is often used in related-art text summarization technologies and the availability of which has been demonstrated. Thus, it is likely to generate a redundant summary when attempting to summarize an utterance sequence such as a lecture that is long and has duplication in the content.

The disclosed technology has been made in view of the aforementioned circumstances, and an object thereof is to provide a summary generating apparatus, a summary generating method, and a summary generating program capable of generating a high-quality summary having few speech recognition errors and low redundancy.

Means for Solving the Problem

To achieve the above object, a summary generating apparatus according to the disclosed technology includes: a speech recognition unit configured to convert an input utterance sequence into a confusion network sequence constituted by a k-best of candidate words of speech recognition results; a lattice generating unit configured to generate a lattice sequence having the candidate words as internal nodes and a combination of k words among the candidate words for an identical speech as an external node, in which edges are extended between internal nodes other than internal nodes included in an identical external node, from the confusion network sequence; an integer programming problem generating unit configured to generate an integer programming problem for selecting a path that maximizes an objective function including at least a coverage score of an important word, of paths following the internal nodes with the edges extended, in the lattice sequence; and a summary generating unit configured to generate a summary of the utterance sequence using the candidate words indicated by the internal nodes included in the path selected by solving the integer programming problem, under a constraint on a length of a summary to be generated.

According to the summary generating apparatus according to the disclosed technology, the speech recognition unit converts an input utterance sequence into a confusion network sequence constituted by a k-best of candidate words of speech recognition results, the lattice generating unit generate a lattice sequence having the candidate words as internal nodes and a combination of k words among the candidate words for an identical speech as an external node, in which edges are extended between internal nodes other than internal nodes included in an identical external node, from the confusion network sequence; the integer programming problem generating unit generates an integer programming problem for selecting a path that maximizes an objective function including at least a coverage score of important words, of paths following internal nodes with edges extended, in the lattice sequence; and the summary generating unit generates a summary of the utterance sequence using candidate words indicated by the internal nodes included in the path selected by solving the integer programming problem, under a constraint on the length of a summary to be generated.

In this way, when candidate words of k-best speech recognition results rather than candidate words of 1-best speech recognition results are used, speech recognition errors can be reduced. In addition, when many important words are covered, it is possible to generate a summary having low redundancy. That is, the summary generating apparatus according to the disclosed technology can generate a high-quality summary having few speech recognition errors and low redundancy.

In addition, the coverage score of the important word can be a score that increases when the number of candidate words included in the summary to be generated increases, among candidate words that are independent words included in the lattice sequence. This can maximize the objective function to generate a summary that covers many independent words as important words.

The objective function can further include a score of the internal node represented by an importance of a candidate word included in the summary to be generated, and the score of an edge indicating a likelihood of connection between candidate words at both ends of the edge included in the summary to be generated. The score of the internal node can also include an appearance frequency and an inverse document frequency of the candidate word and a confidence of speech recognition for the candidate word. Furthermore, the score of the edge can include a bigram appearance rate of candidate words at both ends of the edge. This can maximize the objective function to generate a summary including important words and word connections.

A summary generating method according to the disclosed technology is a summary generating method performed at a summary generating apparatus including a speech recognition unit, a lattice generating unit, an integer programming problem generating unit, and a summary generating unit; the method including: converting, at the speech recognition unit, an input utterance sequence into a confusion network sequence constituted by a k-best of candidate words of speech recognition results; generating, at the lattice generating unit, a lattice sequence having the candidate words as internal nodes and a combination of k words among the candidate words for an identical speech as an external node, in which edges are extended between internal nodes other than internal nodes included in an identical external node, from the confusion network sequence; generating, at the integer programming problem generating unit, an integer programming problem for selecting a path that maximizes an objective function including at least a coverage score of an important word, of paths following the internal nodes with the edges extended, in the lattice sequence; and generating, at the summary generating unit, a summary of the utterance sequence using the candidate words indicated by the internal nodes included in the path selected by solving the integer programming problem, under a constraint on a length of a summary to be generated.

Furthermore, a summary generating program according to the disclosed technology is a program for causing a computer to function as each unit of the summary generating apparatus.

In addition, a storage medium according to the disclosed technology is a storage medium that stores a program for causing a computer to function as each unit of the summary generating apparatus.

Effects of the Invention

As described above, according to the summary generating apparatus, the summary generating method, the summary generating program, and the storage medium according to the disclosed technology, a high-quality summary having few speech recognition errors and low redundancy can be generated by using candidate words of k-best speech recognition results and generating a summary to maximize an objective function including a coverage score of important words.

DESCRIPTION OF EMBODIMENTS

Hereinafter, an example of an embodiment for implementing the disclosed technology will be described in detail with reference to drawings.

A summary generating apparatus according to a present embodiment is configured as a computer including a central processing unit (CPU), a random access memory (RAM), a read only memory (ROM), a hard disk drive (HDD), and the like. A summary generating program according to the present embodiment is stored in the ROM. Note that the summary generating program may be stored in the HDD.

Also, the summary generating program may be installed in advance in the summary generating apparatus, for example. The summary generating program may be implemented by being installed in the summary generating apparatus appropriately by being stored in a nonvolatile storage medium or being distributed via a network. Note that examples of the nonvolatile storage medium include a compact disc read only memory (CD-ROM), a magneto-optical disc, a digital versatile disc read only memory (DVD-ROM), a flash memory, a memory card, and the like.

The CPU functions as each of functional units of the summary generating apparatus, which will be described below, by reading and executing the summary generating program stored in the ROM.

Figure 1:
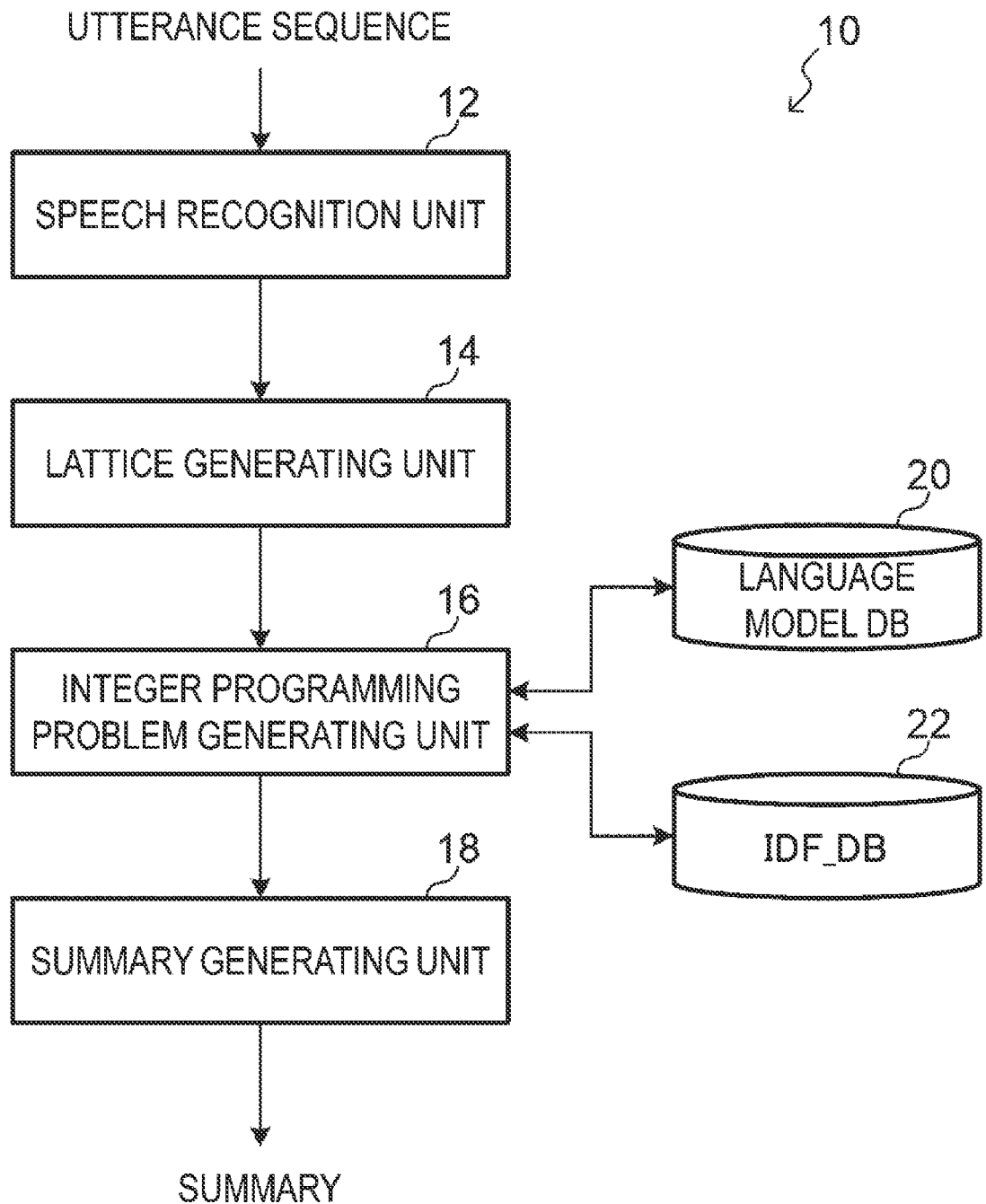
FIG. 1 is a functional block diagram of a summary generating apparatus according to a present embodiment.

As illustrated in FIG. 1, for example, an utterance sequence such as a lecture, which includes U utterances, that is, an utterance sequence with a length U (voice data) is input to a summary generating apparatus 10 according to the present embodiment. Summary generating processing is then performed by functional units to output a summary (text data) of the input utterance sequence.

The summary generating apparatus 10 functionally includes a speech recognition unit 12, a lattice generating unit 14, an integer programming problem generating unit 16, and a summary generating unit 18, as illustrated in FIG. 1. In addition, a language model database (DB) 20 and IDF_DB 22 are stored in a predetermined storage area of the summary generating apparatus 10 or an external storage device communicable with the summary generating apparatus 10. The language model DB 20 stores bigram appearance rates of words computed in advance using a lot of corpuses. The IDF_DB 22 stores an inverse document frequency (idf) of words computed in advance using a lot of corpuses.

Figure 2:
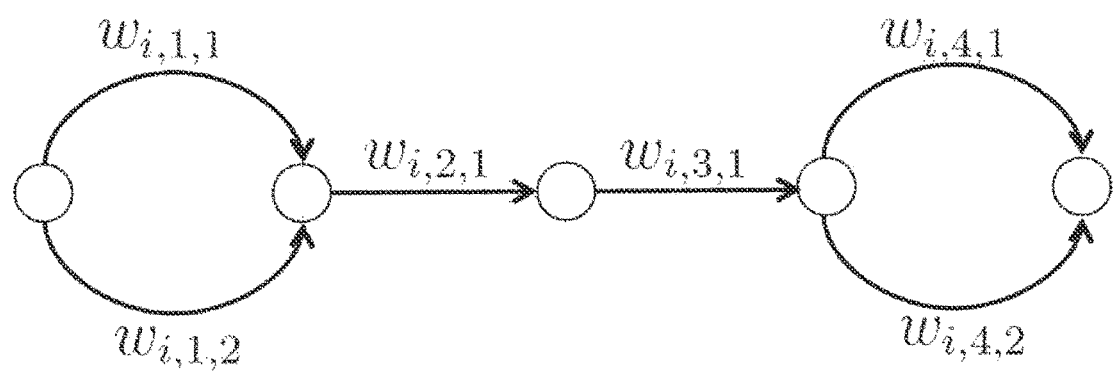
FIG. 2 is a diagram for describing a confusion network sequence.

The speech recognition unit 12 converts the input utterance sequence into a k-best confusion network sequence. The confusion network is a unified representation of a plurality of speech recognition candidates as a single network. An example of the confusion network for the i-th utterance included in the utterance sequence is illustrated in FIG. 2. $w_{i,j,k}$ represents a word that is a recognition result with the k-th confidence for the j-th word of the i-th confusion network. When there are a plurality of edges transitioning from a node to a node, selection of edges with high confidence results in a 1-best speech recognition result. An existing speech recognition system technique can be used as a technique for converting an utterance sequence into a confusion network sequence.

The speech recognition unit 12 passes the converted confusion network sequence to the lattice generating unit 14.

Figure 3:
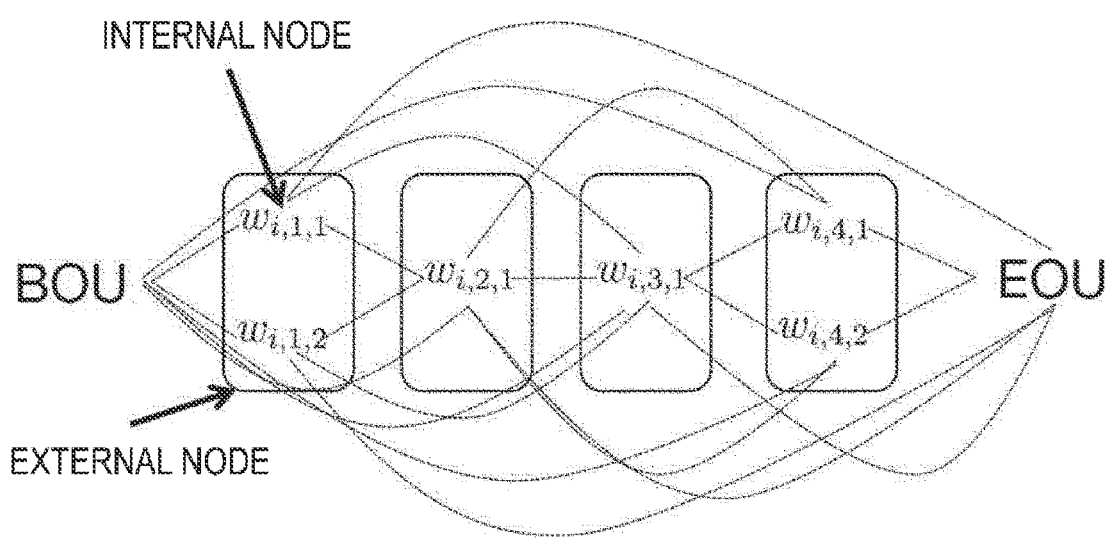
FIG. 3 is a diagram for describing a lattice sequence.

The lattice generating unit 14 converts the confusion network sequence received from the speech recognition unit 12 into a lattice sequence having candidate words of the speech recognition result as internal nodes and a combination of k words among the candidate words for an identical speech as an external node. The lattice generating unit 14 also prepares nodes designated as BOU and EOU as special nodes representing start and end of utterance, respectively. The lattice generating unit 14 extends an edge between any internal node and each of an internal node located to the left thereof and the BOU, and extends an edge between the node and each of an internal node located to the right thereof and the EOU. No edge is extended between internal nodes belonging to an identical external node. The lattice generating unit 14 thus generates a lattice sequence in which edges are extended to obtain all paths that follow the internal nodes from the BOU to the EOU. FIG. 3 illustrates an example in which the confusion network sequence illustrated in FIG. 2 has been converted into a lattice sequence.

The lattice generating unit 14 passes the generated lattice sequence to the integer programming problem generating unit 16.

The integer programming problem generating unit 16 generates an integer programming problem from the lattice sequence received from the lattice generating unit 14 for selecting a path of internal nodes that maximizes an objective function, under a constraint on the number of letters of a summary to be generated. In the present embodiment, an integer programming problem is generated for selecting a path which maximizes the sum of importances of internal nodes, the sum of importances of edges, and the coverage score of important words, from the lattice sequence.

The objective function of summary generation is shown in Expression (1) below.

[Math. 1]

$$\text{maximize} \sum_{i=1}^{|U|} \left( \alpha \cdot \sum_{j=1}^{|V_i|} \sum_{k=1}^{|N_{i,j}|} f_{i,j,k} n_{i,j,k} + \beta \cdot \sum_{s=1}^{|V_i|-1} \sum_{p=1}^{|N_{i,s}|} \sum_{t=s+1}^{|V_i|} \sum_{q=1}^{|N_{i,t}|} g_{i,s,p}^{i,t,q} e_{i,s,p}^{i,t,q} \right) + \sum_{h=1}^{|W|} z_h \quad (1)$$

$$\text{subject to } \sum_{i=1}^{|U|} \ell_{i,j,k} n_{i,j,k} \leq L \quad (2)$$

$$\forall i, j: \sum_{k=1}^{|N_{i,j}|} n_{i,j,k} \leq 1 \quad (3)$$

$$\forall i, j, k, s, p: \sum_{s=1}^{j-1} \sum_{p=1}^{|N_{i,a}|} -n_{i,j,k} = 0 \quad (4)$$

$$\forall i, j, k, t, q: \sum_{t=j+1}^{|V_i|} \sum_{q=1}^{|N_{i,j}|} = 0 \quad (5)$$

$$\forall i: \frac{\sum_{j=1}^{|V_i|} \sum_{k=1}^{|N_{i,j}|} n_{i,j,k}}{K} \geq a_{i,1} \quad (6)$$

$$\forall i: 1 - \frac{\sum_{j=1}^{|V_i|} \sum_{k=1}^{|N_{i,j}|} n_{i,j,k}}{|V_i|} \geq a_{i,2} \quad (7)$$

$$\forall i: a_{i,1} + a_{i,2} = 1 \quad (8)$$

-continued $$\forall i, j, k: n_{i,j,j} \in \{0, 1\} \quad (9)$$

$$\forall i, s, t, p, q: e_{i,s,p}^{i,t,q} \in \{0, 1\} \quad (10)$$

$$\forall h: e_h \in \{0, 1\} \quad (11)$$

$$\forall i: A_{i,*} \in \{0, 1\} \quad (12)$$

Let i be an index of a lattice, let j be an index of an external node in the i-th lattice, and let k be an index of an internal node included in the j-th external node of the i-th lattice. Let a lattice set be U, let a set of external nodes in the i-th lattice be $V_i$, and let a set of internal nodes included in the j-th external node in the i-th lattice be $N_{i,j}$. In addition, let W be a set of independent words included in U.

In Expression (1), the first term represents a score of a node, the second term represents a score of an edge, and the third term represents a coverage score of an important word. $n_{i,j,k}$ is a binary variable representing whether the k-th word included in the j-th external node of the i-th lattice is included in a summary, and $f_{i,j,k}$ is an importance score for $w_{i,j,k}$. The definition of $f_{i,j,k}$ is as shown in Expression (13) below.

[Math. 2]

$$f_{i,j,k} = \text{tfidf}(w_{i,j,k}) + \text{conf}(w_{i,j,k}). \quad (13)$$

Here, tfidf( ) is a tfidf score of a word and tf (term frequency) is an appearance frequency of a word in an utterance sequence. idf is obtained from IDF_DB 22. conf( ) is a recognition confidence score of a word, which is a value obtained when the speech recognition unit 12 performs speech recognition.

$e_{i,s,p}^{i,t,q}$ is a binary variable of whether or not to include an edge between $w_{i,s,p}$ and $w_{i,t,q}$ in the summary. $g_{i,s,p}^{i,t,q}$ is an importance score of $e_{i,s,p}^{i,t,q}$ and can be a bigram probability of appearance of a word $w_{i,s,p}$ and a word $w_{i,t,q}$ obtained from the language model DB 20. The definition of $g_{i,s,p}^{i,t,q}$ is as shown in the following Expression (14). Note that $g_{i,s,p}^{i,t,q}$ is not limited to the example shown in Expression (14) as long as it is obtained by scoring the likelihood of word-to-word connection.

[Math. 3]

$$g_{i,s,p}^{i,t,q} = P_{bigram}(w_{i,t,q} | w_{i,s,p}). \quad (14)$$

α and β are parameters that adjust the sum of scores of nodes and the sum of scores of edges, and their optimal values are determined using data for verification. $z_h$ is a binary variable that is 1 if the h-th independent word in W is included in the summary and is 0 if the h-th independent word in W is not included in the summary, and the higher score thereof represents covering many important words. That is, there is an effect of covering many important words, and thus redundancy of the generated summary is reduced.

Figure 4:
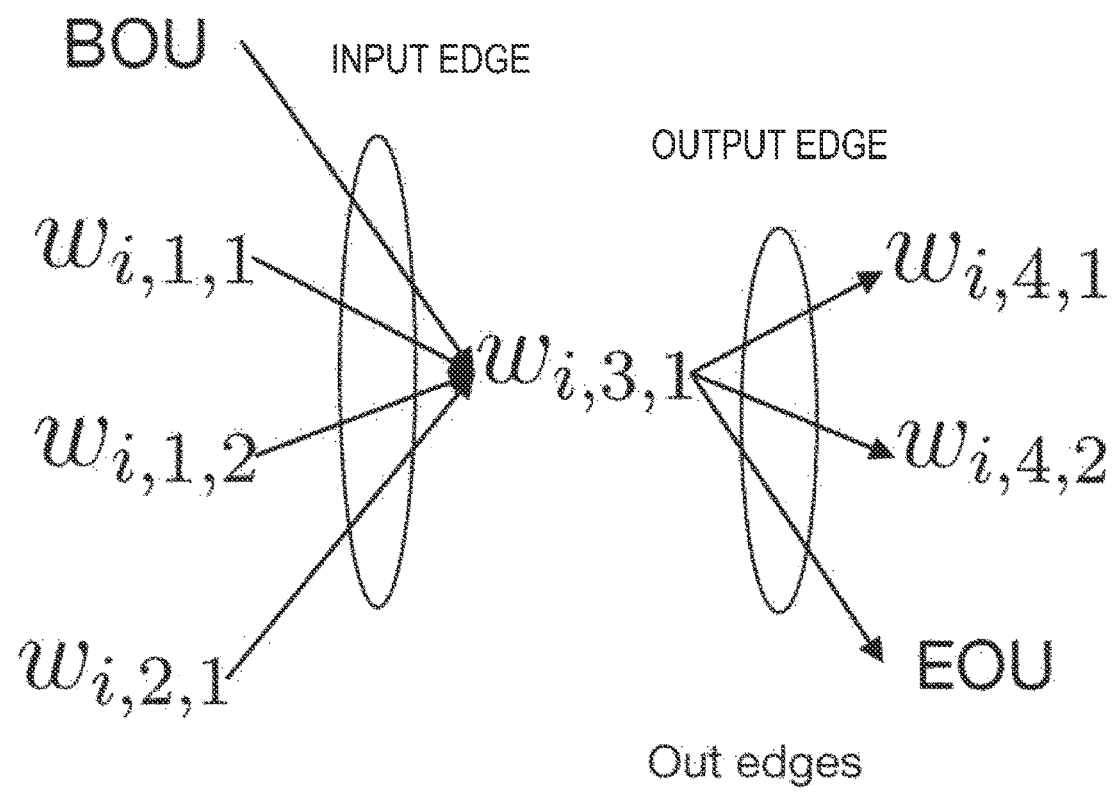
FIG. 4 is a diagram for describing selection of an internal node and an edge.

Expression (2) is a constraint on the summary length and ensures that the number of letters of the summary is less than or equal to L. Expression (3) represents that at most one internal node (word) is selected from any external node. Expressions (4) and (5) represent that, as illustrated in FIG. 4, in order to include any internal node in the summary, one edge at each end thereof must be selected (one from the input edges and one from the output edges). Expressions (6) and (7) are constraints to avoid extracting a short path from one utterance, and indicate that the number of words must be greater than or equal to K in order to select a word sequence as a summary from the i-th lattice.

In addition, if there is a word required in a summarized sentence as language knowledge in addition to the above, $n_{i,j,k}$ corresponding to the word only needs to be set to 1.

The integer programming problem generating unit 16 passes the generated integer programming problem to the summary generating unit 18.

The summary generating unit 18 solves the integer programming problem received from the integer programming problem generating unit 16 using an existing dedicated solver to extract $w_{i,j,k}$ that makes $n_{i,j,k}=1$, thereby generating a summary and outputting the generated summary.

Figure 5:
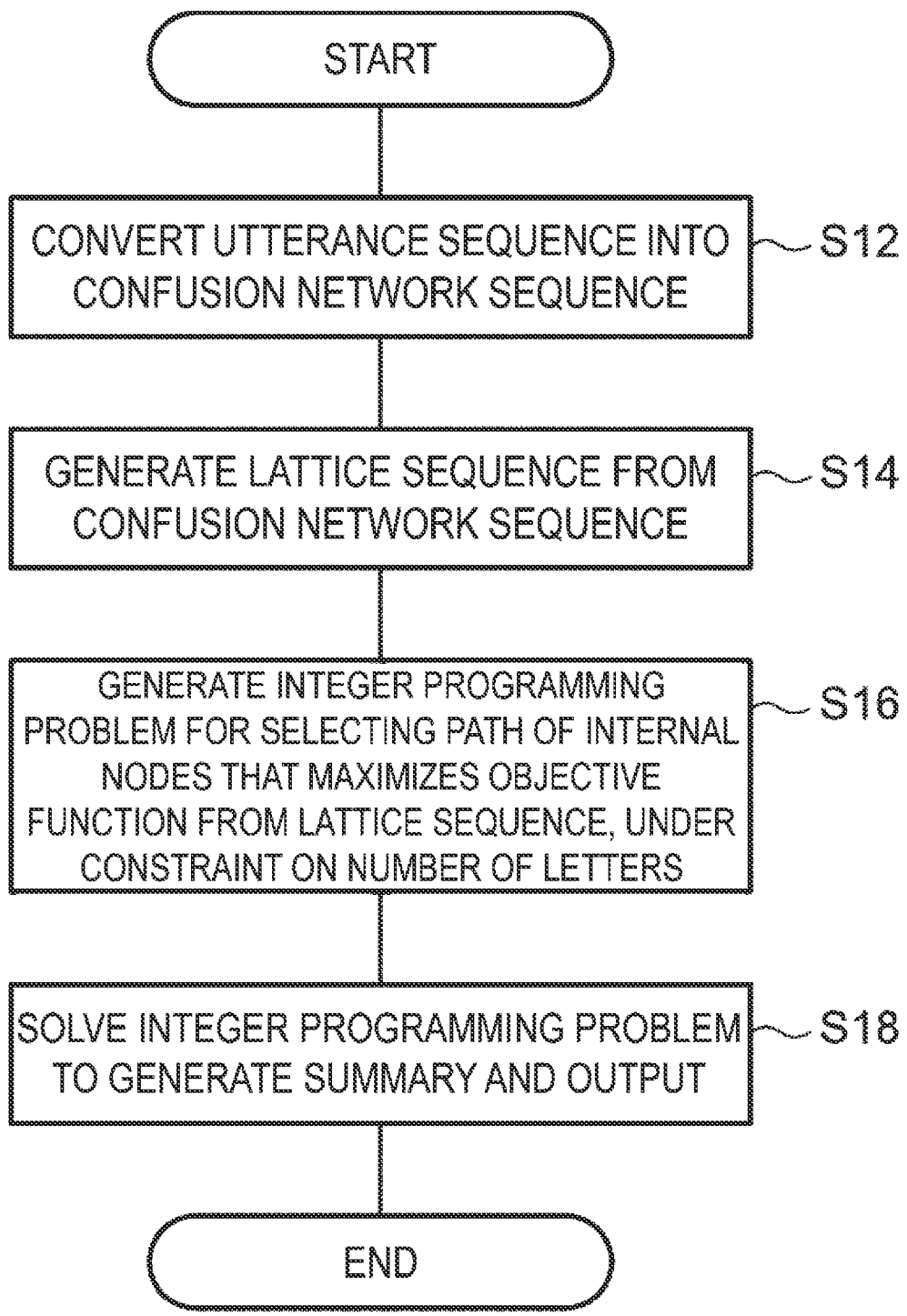
FIG. 5 is a flowchart illustrating an example of a flow of processing performed using a summary generating program according to the present embodiment.

Next, operation of the summary generating apparatus 10 according to the present embodiment will be described with reference to FIG. 5. Note that FIG. 5 is a flowchart illustrating an example of a flow of summary generation processing performed by the summary generating program according to the present embodiment.

In step S12, the speech recognition unit 12 converts an input utterance sequence into a k-best confusion network sequence. The speech recognition unit 12 passes the converted confusion network sequence to the lattice generating unit 14.

Next, in step S14, the lattice generating unit 14 converts the confusion network sequence received from the speech recognition unit 12 into a lattice sequence having candidate words of speech recognition results as internal nodes and a combination of k words among the candidate words for an identical speech as an external node. In addition, the lattice generating unit 14 prepares nodes designated as BOU and EOU representing start and end of utterance, respectively, and extends edges between internal nodes other than internal nodes belonging to the identical external node. The lattice generating unit 14 passes the generated lattice sequence to the integer programming problem generating unit 16.

Next, in step S16, the integer programming problem generating unit 16 generates an integer programming problem for selecting a path of internal nodes that maximizes an objective function including a score of an internal node, a score of an edge, and a coverage score of an important word, from the lattice sequence received from the lattice generating unit 14, under a constraint on the number of letters of a generated summary. The integer programming problem generating unit 16 passes the generated integer programming problem to the summary generating unit 18.

Next, in step S18, the summary generating unit 18 solves the integer programming problem received from the integer programming problem generating unit 16 using an existing dedicated solver, generates a summary using candidate words indicated by the internal nodes included in the path selected from the lattice sequence, and outputs the generated summary. The summary generation processing then ends.

As described above, the summary generating apparatus according to the present embodiment converts an input utterance sequence into a confusion network sequence constituted by a k-best of candidate words of speech recognition results. Furthermore, the summary generating apparatus according to the present embodiment generates a lattice sequence having the candidate words as internal nodes and a combination of k words among the candidate words for an identical speech as an external node, in which edges are extended between internal nodes other than internal nodes included in the identical external node, from the confusion network sequence. The summary generating apparatus according to the present embodiment further generates an integer programming problem for selecting a path that maximizes an objective function including at least a coverage score of an important word, among paths following internal nodes with edges extended, in the lattice sequence. Furthermore, the summary generating apparatus according to the present embodiment generates a summary of the utterance sequence using candidate words indicated by the internal nodes included in the path selected by solving the integer programming problem under a constraint on the length of the summary to be generated. With the processing described above, the summary generating apparatus according to the present embodiment can generate a high-quality summary having few speech recognition errors and low redundancy.

Note that configuration and processing of the summary generating apparatus described in the aforementioned embodiment each are just an example and can be modified in accordance with situations without departing from the gist.

In addition, the flow of the processing of the program described in the aforementioned embodiment is also an example, and unnecessary steps may be deleted, new steps may be added, or the processing order may be changed without departing from the gist.

Also, although the case in which the processing according to the above embodiment is implemented by a software configuration using a computer executing the program has been described in the aforementioned embodiment, the embodiment is not limited thereto. The embodiment may be implemented by a hardware configuration or a combination of a hardware configuration and a software configuration, for example.

REFERENCE SIGNS LIST

10 Summary generating apparatus
12 Speech recognition unit
14 Lattice generating unit
16 Integer programming problem generating unit
18 Summary generating unit
20 Language model DB
22 IDF_DB

The invention claimed is:

1. A summary generating apparatus comprising a processor configured to execute operations comprising:
   converting an input utterance sequence into a confusion network sequence constituted by a k-best of candidate words of speech recognition results;
   generating, a lattice sequence having the candidate words as internal nodes and a combination of k words among the candidate words for an identical speech as an external node, in which edges are extended between internal nodes other than internal nodes included in an identical external node, from the confusion network sequence;
   generating an integer programming problem for selecting a path that maximizes an objective function including at least a coverage score of an important word, of paths following the internal nodes with the edges extended, in the lattice sequence; and
   generating a summary of the utterance sequence using the candidate words indicated by the internal nodes included in the path selected by solving the integer programming problem, under a constraint on a length of a summary to be generated.

2. The summary generating apparatus according to claim 1, wherein the coverage score of the important word is a score that increases when the number of candidate words included in the summary to be generated increases, among candidate words that are independent words included in the lattice sequence.

3. A computer-readable non-transitory recording medium storing computer-executable summary generating program instructions that when executed by a processor cause a computer system to execute operations as the summary generating apparatus according to claim 2.

4. The summary generating apparatus according to claim 2, wherein the objective function further comprises a score of the internal node represented by an importance of a candidate word included in the summary to be generated, and a score of an edge indicating a likelihood of connection between candidate words at both ends of the edge included in the summary to be generated.

5. A computer-readable non-transitory recording medium storing computer-executable summary generating program instructions that when executed by a processor cause a computer system to execute operations as the summary generating apparatus according to claim 4.

6. The summary generating apparatus according to claim 1, wherein the objective function further comprises a score of the internal node represented by an importance of a candidate word included in the summary to be generated, and a score of an edge indicating a likelihood of connection between candidate words at both ends of the edge included in the summary to be generated.

7. The summary generating apparatus according to claim 6, wherein the score of the internal node comprises an appearance frequency and an inverse document frequency of the candidate word and a confidence of speech recognition for the candidate word.

8. A computer-readable non-transitory recording medium storing computer-executable summary generating program instructions that when executed by a processor cause a computer system to execute operations as the summary generating apparatus according to claim 7.

9. The summary generating apparatus according to claim 6, wherein the score of the edge comprises a bigram appearance rate of candidate words at both ends of the edge.

10. A computer-readable non-transitory recording medium storing computer-executable summary generating program instructions that when executed by a processor cause a computer system to execute operations as f the summary generating apparatus according to claim 9.

11. A computer-readable non-transitory recording medium storing computer-executable summary generating program instructions that when executed by a processor cause a computer system to execute operations as the summary generating apparatus according to claim 6.

12. A computer-readable non-transitory recording medium storing computer-executable summary generating program instructions that when executed by a processor cause a computer system to execute operations as the summary generating apparatus according to claim 1.

13. A computer-readable non-transitory storage medium that stores a summary generating program that when executed by a processor cause a computer to execute operations as the summary generating apparatus according to claim 1.

14. A summary generating method performed at a summary generating apparatus comprising a speech recognition unit, a lattice generating unit, an integer programming problem generating unit, and a summary generating unit, the method comprising:

converting, at the speech recognition unit, an input utterance sequence into a confusion network sequence constituted by a k-best of candidate words of speech recognition results;

generating, at the lattice generating unit, a lattice sequence having the candidate words as internal nodes and a combination of k words among the candidate words for an identical speech as an external node, in which edges are extended between internal nodes other than internal nodes included in an identical external node, from the confusion network sequence;

generating, at the integer programming problem generating unit, an integer programming problem for selecting a path that maximizes an objective function including at least a coverage score of an important word, of paths following the internal nodes with the edges extended, in the lattice sequence; and generating, at the summary generating unit, a summary of the utterance sequence using the candidate words indicated by the internal nodes included in the path selected by solving the integer programming problem, under a constraint on a length of a summary to be generated.

* * * * *